US009426730B2

(12) United States Patent
Chambers et al.

(10) Patent No.: US 9,426,730 B2
(45) Date of Patent: Aug. 23, 2016

(54) GNSS-ASSISTED CELLULAR NETWORK SELECTION

(71) Applicant: BlackBerry Limited, Waterloo (CA)

(72) Inventors: Jarrod Chambers, Ottawa (CA); Mahesh Narayanan, Stittsville (CA); Jean-Philippe Paul Cormier, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/517,450

(22) Filed: Oct. 17, 2014

(65) Prior Publication Data

US 2016/0112940 A1    Apr. 21, 2016

(51) Int. Cl.
*H04W 4/00* (2009.01)
*H04W 48/18* (2009.01)
*H04W 72/02* (2009.01)
*H04W 84/04* (2009.01)
*H04W 48/16* (2009.01)

(52) U.S. Cl.
CPC .............. *H04W 48/18* (2013.01); *H04W 72/02* (2013.01); *H04W 48/16* (2013.01); *H04W 84/042* (2013.01)

(58) Field of Classification Search
CPC ... H04W 48/18; H04W 72/02; H04W 48/16; H04W 84/042
USPC ...................................................... 455/435.3
See application file for complete search history.

(56) References Cited

U.S. PATENT DOCUMENTS

| 6,225,945 | B1 * | 5/2001 | Loomis ................... G01S 19/24 |
| | | | 342/357.46 |
| 9,125,146 | B1 * | 9/2015 | Edara ..................... H04W 48/18 |
| 2002/0101993 | A1 | 8/2002 | Eskin |
| 2006/0217153 | A1 | 9/2006 | Coles et al. |
| 2007/0004404 | A1 | 1/2007 | Buckley et al. |
| 2011/0124335 | A1 | 5/2011 | Martin et al. |
| 2011/0279323 | A1 * | 11/2011 | Hung ...................... G01S 19/14 |
| | | | 342/451 |
| 2012/0034917 | A1 * | 2/2012 | Kazmi .................. H04W 48/16 |
| | | | 455/434 |
| 2012/0282924 | A1 | 11/2012 | Tagg et al. |
| 2012/0309391 | A1 * | 12/2012 | Zhang ................... H04W 48/16 |
| | | | 455/432.1 |
| 2013/0281085 | A1 * | 10/2013 | Sen ....................... H04W 48/18 |
| | | | 455/426.1 |
| 2013/0314276 | A1 | 11/2013 | Zhang et al. |

OTHER PUBLICATIONS

Extended European Search Report mailed Mar. 15, 2016, in corresponding European Patent Application No. 15190263.2.

* cited by examiner

*Primary Examiner* — Juan A Torres
(74) *Attorney, Agent, or Firm* — Moffat & Co.

(57) ABSTRACT

A method of selecting a cellular network entails determining a current location using a Global Navigation Satellite System (GNSS) receiver in a mobile device, prioritizing bands based on the current location to create a set of prioritized bands, and searching the set of prioritized bands for the cellular network. This method expedites selection of the cellular network when a mobile device is powered on or when its cellular radiofrequency transceiver is activated.

9 Claims, 5 Drawing Sheets

GNSS-ASSISTED CELLULAR NETWORK SELECTION

TECHNICAL FIELD

The present disclosure relates generally to wireless communications and, in particular, to cellular network selection techniques.

BACKGROUND

When a cellular radiofrequency transceiver of a mobile device is activated, the mobile device seeks to acquire a suitable wireless network in order to obtain voice and data services. System selection algorithms enable the mobile device to find the optimal wireless network under various conditions.

In General Packet Radio Service (GPRS), Universal Mobile Telecommunications System (UMTS) and Long Term Evolution (LTE) cellular networks, a public land mobile network (PLMN) list is normally used for the cellular network selection. The PLMN list contains a list of networks specifying a mobile country code (MCC) and a mobile network code (MNC) with a priority order. The PLMN list combined with access technology are typically stored in a subscriber identity module (SIM) or universal subscriber identity module (USIM) card. The mobile device scans all the channels within GPRS or UMTS or LTE band groups until a suitable system is found.

BRIEF DESCRIPTION OF THE DRAWINGS

Further features and advantages of the present disclosure will become apparent from the following detailed description, taken in combination with the appended drawings, in which.

It will be noted that throughout the appended drawings like features are identified by like reference numerals.

DETAILED DESCRIPTION

Figure 1:
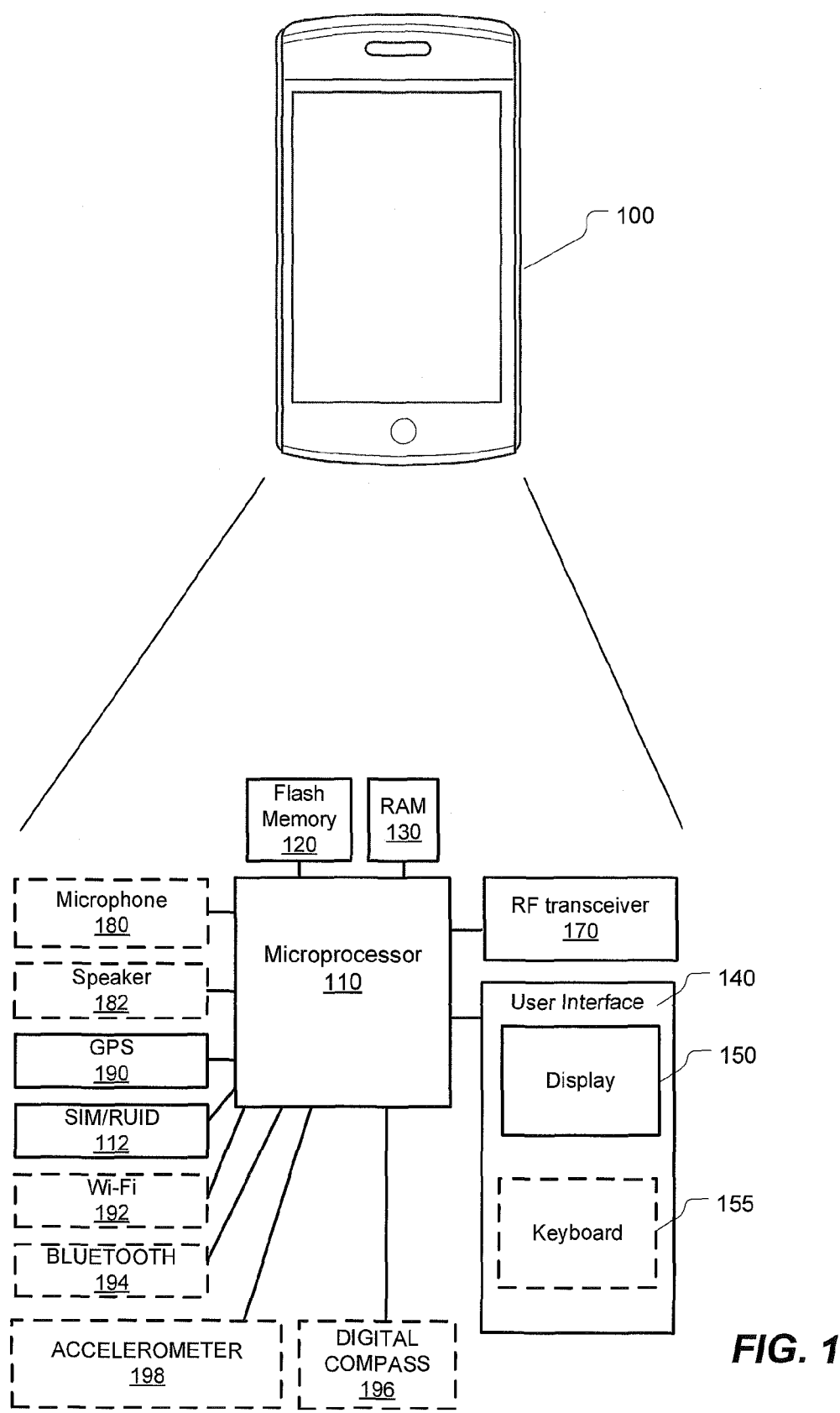
FIG. 1 is a depiction of a mobile device in accordance with one embodiment of the present disclosure.

On activation of a cellular radiofrequency transceiver of a mobile device it is desirable for the cellular network selection algorithm to find a cellular network quickly in order to prolong battery life and to provide a good user experience.

However, mobile devices today need to scan an ever-growing set of bands and radio access technologies (RATs). Currently, LTE uses 11 bands, UMTS uses 7 bands and GSM uses 4 bands. This scan can take a significant amount of time to complete while also depleting the battery. A technique to assist cellular network selection is therefore highly desirable.

The present disclosure provides a technique for selecting a cellular network by using a Global Navigation Satellite System (GNSS) such as Global Positioning System (GPS) to determine a current location of the mobile device. The current location of the mobile device is then used to prioritize the band search, thereby expediting the process of finding a desired cellular network when the mobile device is powered on or when a cellular radiofrequency transceiver of the mobile device is activated.

Accordingly, one aspect of the present disclosure is a method of selecting a cellular network. The method entails determining a current location using a Global Navigation Satellite System (GNSS) receiver in a mobile device, prioritizing cellular network frequency bands based on the current location to define a band priority, and selecting the cellular network based on the band priority.

Another aspect of the present disclosure is a non-transitory computer-readable medium comprising instructions in code which when loaded into a memory and executed by a processor of a mobile device cause the mobile device to determine a current location using a Global Navigation Satellite System (GNSS) receiver in a mobile device, prioritize cellular network frequency bands based on the current location to define a band priority, and select a cellular network based on the band priority.

Another aspect of the present disclosure is a mobile device that includes a cellular radiofrequency transceiver, a Global Navigation Satellite System (GNSS) receiver to determine a current location of the mobile device and a processor configured to prioritize cellular network frequency bands based on the current location to define a band priority and to select a cellular network based on the band priority.

The details and particulars of these aspects of the disclosure will now be described below, by way of example, with reference to the drawings.

In general, this technology may be implemented by a mobile device (i.e., a mobile communications device or wireless communications device) having a cellular radiofrequency transceiver as well as a GNSS receiver, e.g. GPS receiver. The mobile device determines its location using the GNSS receiver and then reorders (prioritizes) its bands for more efficiently searching for a cellular network. In one implementation, the GNSS receiver obtains only a partial or approximate position fix, e.g. a snapshot or single-shot GPS fix, to provide an approximate location, e.g. a city, state or province, country, continent. This enables band reordering for more efficient searching.

FIG. 1 is a depiction of a mobile device in accordance with an embodiment of the present disclosure. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and may optionally include a keyboard 155 or keypad. The user interface may also include an optical jog pad and/or a thumbwheel, trackball, track pad or equivalent.

As depicted by way of example in FIG. 1, the mobile device 100 includes a cellular radiofrequency (RF) transceiver 170. The cellular radiofrequency transceiver 170 enables wireless communication with one or more base stations over a cellular wireless network using cellular communication protocols and standards for both voice calls and packet data transfer such as GSM, CDMA, GPRS, EDGE, UMTS, LTE, etc.

The mobile device 100 may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may also include one or more ports for wired connections, e.g. USB, HDMI, FireWire (IEEE 1394), etc.

The mobile device 100 optionally includes a speech-recognition subsystem that has a microphone 180 for transforming voice input in the form of sound waves into an electrical signal. Optionally, the mobile device 100 may include a speaker 182 and/or an earphone jack.

The mobile device 100 includes a position-determining subsystem such as a Global Navigation Satellite System (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites. Although the present disclosure refers expressly to the Global Positioning System, it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

The mobile device 100 optionally includes a Wi-Fi transceiver 192 for receiving a Wi-Fi signal transmitted by a Wi-Fi access point, router, adapter or hotspot. Although Wi-Fi® is a registered trademark of the Wi-Fi Alliance, it shall be identified simply as "Wi-Fi" in this specification.

The mobile device 100 optionally includes a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or accelerometer 198. Other sensors may include a tilt sensor, gyroscope or equivalent.

The mobile device 100 may comprise a wireless communications device, tablet, personal digital assistant, cell phone, smart phone, smart watch, smart accessory, gaming device or any other portable electronic device that has a cellular transceiver and a GNSS receiver.

Figure 2:
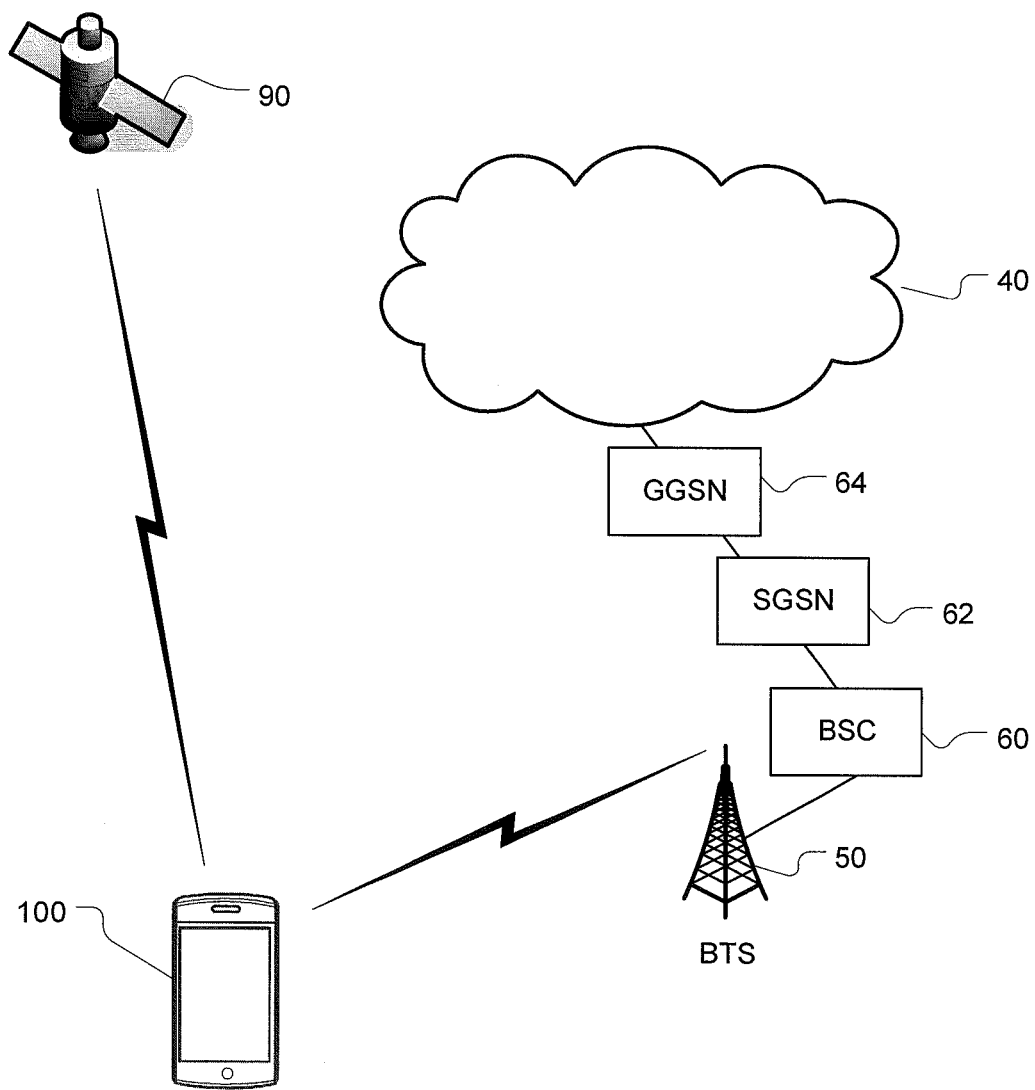
FIG. 2 is a depiction of a system in accordance with one embodiment of the present disclosure.

In the embodiment depicted by way of example in FIG. 2, the GNSS receiver 190 of the mobile device 100 receives GNSS signals from orbiting GNSS satellites 90 to enable the GNSS receiver to determine a current location of the mobile device. Since cellular network frequency bands can be reordered based on approximate locations (e.g. country, state, county, city), it is not necessary for the GNSS receiver to obtain a precise fix (e.g. a street address). Snapshot or single-shot GPS positioning techniques may thus be used to quickly provide the approximate location without using much battery (as compared to obtaining a complete position fix). Rapid fix techniques may also be employed to obtain a coarse approximation for the current location. One such technique for obtaining a quick GNSS fix is based on Doppler frequency shift measurements, ephemeris data already stored in a memory of the mobile device and a received time tag within a received GNSS signal. Although it is more efficient to use rapid-fix or single-shot techniques, it is also possible to obtain a complete GNSS position fix for the purposes of prioritizing the bands.

Regardless of the technique used to obtain a partial or approximate GNSS position fix, the mobile device uses the current location, however coarse, to reorder (prioritize) the bands for more efficient searching. In prioritizing the bands, the mobile device thus creates a set of prioritized bands. The set of prioritized cellular network frequency bands may include all of the bands or a subset of the bands, if certain bands can be eliminated as being for other continents or other distant geographical regions. Once the desired cellular network 40 is identified, the mobile device 100 connects to the cellular network 40 via a base transceiver station (BTS) 50, base station controller (BSC) 60, Serving GPRS Support Node (SGSN) 62, and Gateway GPRS Support Node (GGSN) 64. Using this band-prioritization technology the mobile device expedites network selection and prolongs the battery life of the mobile device.

Figure 3:
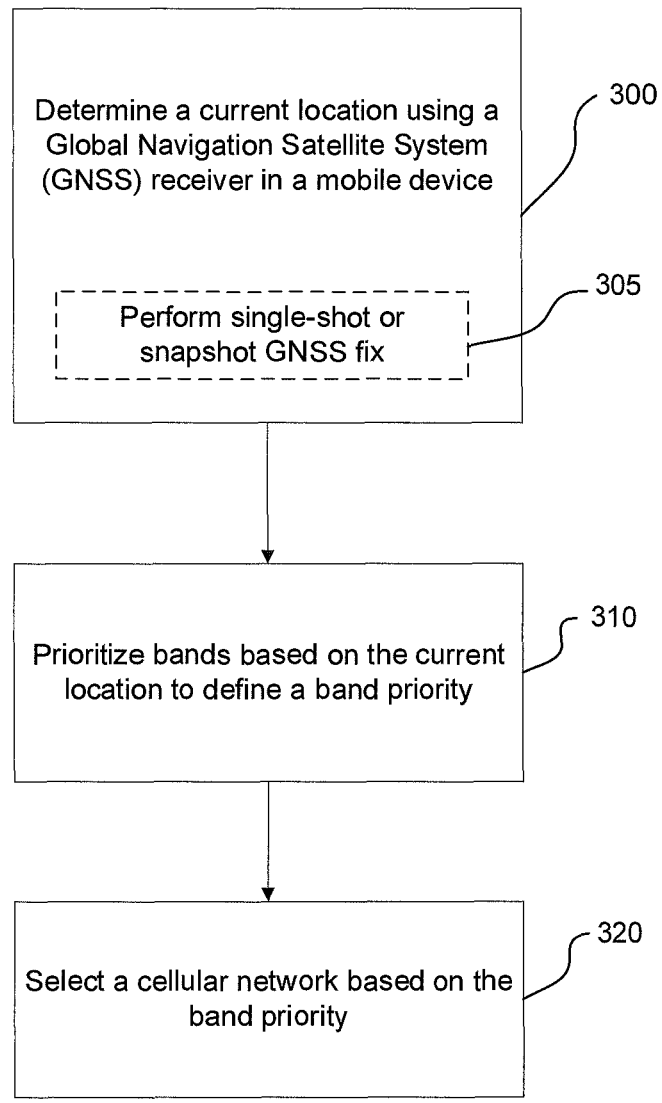
FIG. 3 is a flowchart outlining a method for selection of a cellular network using Global Positioning System (GPS)

A network-selection method is outlined by way of example in FIG. 3. As depicted in the flowchart of FIG. 3, the method entails steps, acts or operations of determining (300) a current location using a Global Navigation Satellite System (GNSS) receiver in a mobile device, prioritizing (310) cellular network frequency bands based on the current location to define a band priority, and selecting (320) the cellular network based on the band priority. Determing the current location optionally includes performing (305) a single-shot or snapshot GNSS fix. Each band has an associated frequency range. For example, an LTE service may use the 1700 MHz (Band 4) frequency or the 2600 MHz (Band 7) frequency.

By way of example, some of the current frequency bands are distributed globally as shown in the table below:

| Frequency Band | Location(s) |
| --- | --- |
| 1 | Africa |
| 2 | USA, Caribbean, Central America |
| 3 | Africa, Asia, Caribbean, Europe, Middle East, Oceania, Venezuela |
| 4 | Canada, Central America, USA |
| 5 | Asia, Central America, USA |
| 7 | Africa, Asia, Canada, Central America, Europe, Middle East, Oceania |
| 8 | Asia, Europe, Oceania |
| 17 | Caribbean, USA |
| 20 | Africa, Europe, Oceania |

If a user travels, for example, to the Caribbean with a mobile device that needs to use Band 17, for example, the mobile device would (using a conventional technique) scan almost all other known bands first before identifying the suitable network. Using embodiments of the present disclosure, however, the mobile device would only scan Bands 2, 3 and 17 first, thus reducing the number of bands to be scanned by over 60%, thereby saving both time and battery power. It will be appreciated that the mapping of geographical locations to frequency bands is expected to change over time as networks evolve and new spectrum is allocated around the world. To address this, in one implementation, the band mapping on the device is updated from time to time, either as part of a regular software update or through a push or pull of data to the device during normal operation.

In one implementation, if scanning has already begun by the time the current location is determined, the current band scan continues for the band being scanned but the remaining bands are reordered so as to search local bands first. In another implementation, the device will search a PLMN list on activating a cellular radiofrequency transceiver and interrupt a search of the PLMN list only when the mobile device has determined the current location and the bands have been prioritized.

In this method, the mobile device exploits knowledge of its current location, as determined, for example, by GNSS, to expedite the system selection upon powering on the device ("power on") or on activating the cellular radio transceiver ("radio on"), which is especially useful when the user travels to a different geographic region. This technique will save device battery life and improve the user experience. In one particular implementation, the mobile device may be configured to automatically download fresh ephemeris data in response to being shut down or in response to the device being put in airplane mode. Alternatively, the mobile device may recognize from its GPS receiver that it is located at an airport. Presuming that the device will be imminently shut off or put into airplane mode for a flight, the processor may instruct the GNSS receiver to update is ephemeris data so that a snap-shot GNSS fix or quick GNSS fix based on Doppler frequency shift measurements and ephemeris data can be used upon reactivating the cellular transceiver on landing at the destination.

In another implementation, the mobile device may obtain the GNSS position fix from an external or separate GNSS-equipped device. For example, an aircraft-based GNSS position fix may be shared, broadcast or otherwise transmitted to the mobile device. This would provide the current location to the mobile device for use in ordering the frequency bands. The GNSS position fix may be obtained by short-range wireless connection, e.g. Wi-Fi, NFC, Bluetooth, etc. In yet other implementations, the GNSS receiver remains on in airplane mode (since the GNSS receiver only receives signals and does not transmit signals) in which case the GNSS fix is immediately available on landing.

Figure 4:
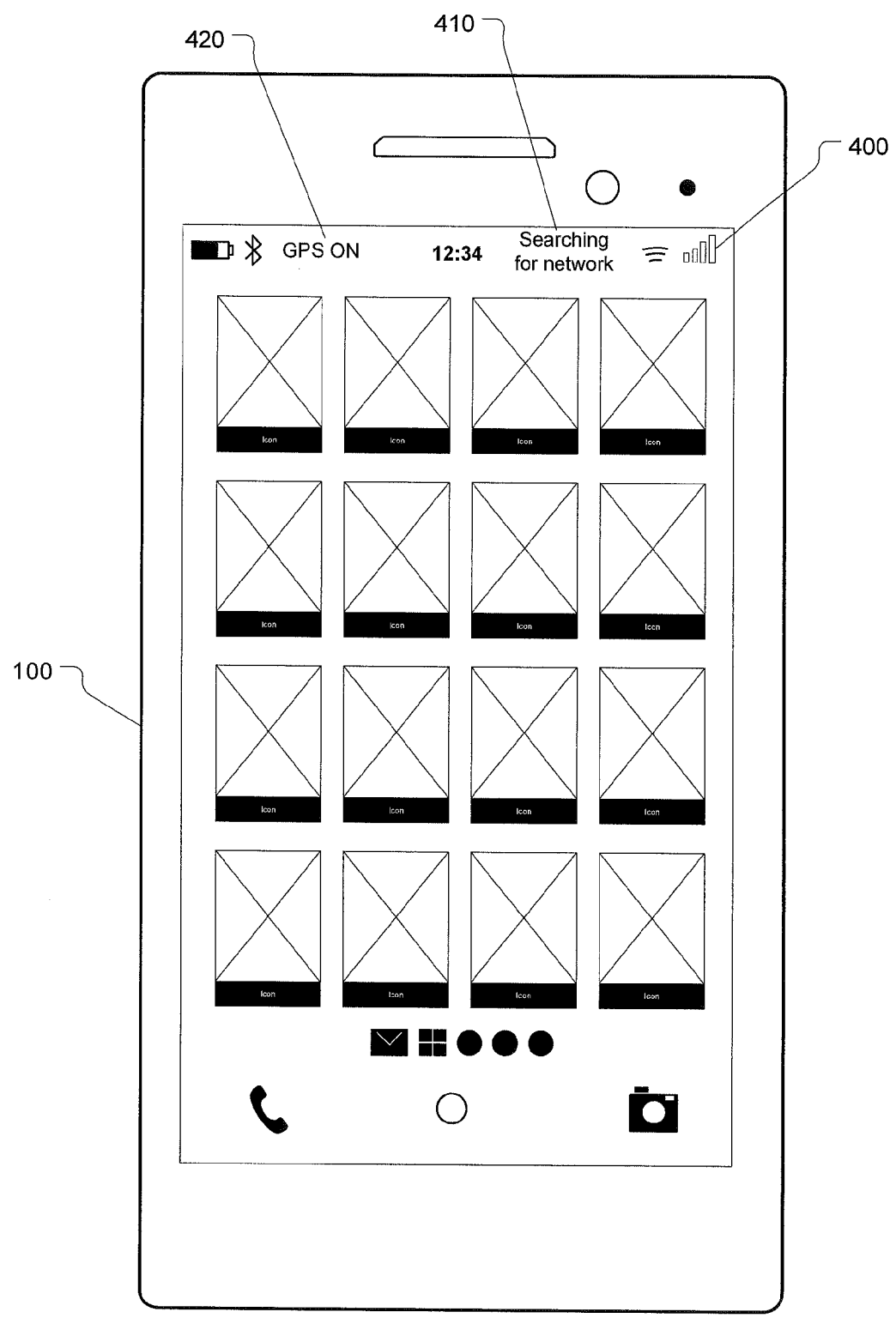
FIG. 4 is a depiction of a mobile device obtaining a GPS position fix to prioritize cellular frequency bands based on location.

FIG. 4 is a depiction of a mobile device obtaining a UPS position fix to prioritize cellular frequency bands based on location. In the embodiment depicted by way of example in FIG. 4, the mobile device 100 displays a signal strength indicator 400 that indicates cellular reception using bars or any equivalent visual indicator. In this case, the bars are not colored or shaded to indicate that there is no cellular reception. The mobile device may further display a search status indication 420, e.g. "searching for network" 410 or any equivalent. In response to this no-signal condition, the GNSS receiver is activated. The mobile device display a GNSS status indicator 430, e.g. "GPS on" or equivalent.

Figure 5:
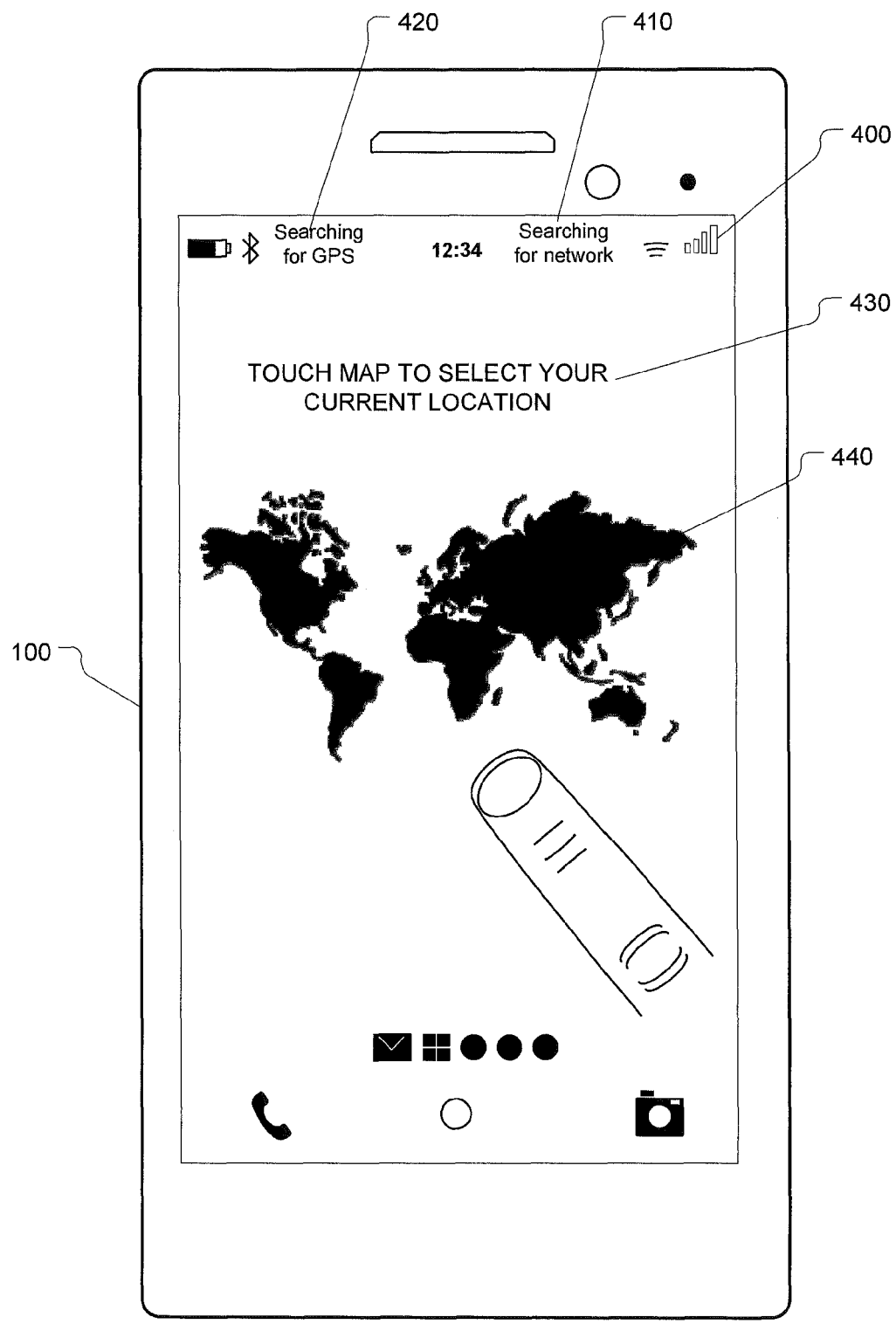
FIG. 5 is a depiction of a mobile device prompting a user to select a global location from a displayed map in response to detecting that a GNSS position fix cannot be obtained within a specified time.

In some cases, the GNSS position fix (or even a single-shot fix) is unavailable or too slow to obtain. In such a case, the mobile device may request and obtain user input corresponding to the location, e.g. country or continent. FIG. 5 is a depiction of a mobile device prompting a user with onscreen instructions 430 to select a global location from a displayed map 440, e.g. by touching the user's current location on the map. This map may be displayed in response to detecting that a GNSS position fix cannot be obtained within a specified time. Alternatively, the map may be displayed in response to user input or in response to a device condition, e.g. a low-battery condition. In other embodiments, a user interface prompts for a selection of a location from a menu or drop-down list of locations, e.g. countries or continents or both. In other embodiments, a user interface prompts for input such as text or voice corresponding to a location, e.g. country or continent.

It will be appreciated that the method is not restricted to cases where the device is powered on or the cellular radio is activated. This method may also apply to other cases, for example, when the mobile device is out of coverage for a long period of time and user may travel to a different geographic region during this period.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

It is to be understood that the singular forms "a," "an," and "the" include plural referents unless the context clearly dictates otherwise. Thus, for example, reference to "a processor" includes reference to one or more of such processors.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of selecting a cellular network, the method comprising:
    determining a current location using a Global Navigation Satellite System (GNSS) receiver in a mobile device, comprising obtaining, using the GNSS receiver, a partial position fix providing a coarse approximation for the current location based on Doppler frequency shift measurements, ephemeris data already stored in a memory of the mobile device and a received time tag within a received GNSS signal;

prioritizing cellular network frequency bands based on the current location to define a band priority; and selecting the cellular network based on the band priority.

2. The method as claimed in claim 1 wherein the GNSS receiver is activated in response to activating a cellular radiofrequency transceiver.

3. The method as claimed in claim 1 comprising searching a PLMN list on activating a cellular radiofrequency transceiver and interrupting the searching of the PLMN list only when the mobile device has determined the current location and the bands have been prioritized.

4. A non-transitory computer-readable medium comprising instructions in code which when loaded into a memory and executed by a processor of a mobile device cause the mobile device to:

determine a current location using a Global Navigation Satellite System (GNSS) receiver in a mobile device, comprising obtaining, using the GNSS receiver, a partial position fix providing a coarse approximation for the current location based on Doppler frequency shift measurements, ephemeris data already stored in a memory of the mobile device and as received time tag within a received GNSS signal;

prioritize cellular network frequency bands based on the current location to define a band priority; and select a cellular network based on the band priority.

5. The computer-readable medium as claimed in claim 4 comprising code to activate the GNSS receiver in response to activating a cellular radiofrequency transceiver.

6. The computer-readable medium as claimed in claim 4 comprising code that causes the mobile device to search a PLMN list on activating a cellular radiofrequency transceiver and interrupt a search of the PLMN list only when the mobile device has determined the current location and the bands have been prioritized.

7. A mobile device comprising:

a cellular radiofrequency transceiver;

a Global Navigation Satellite System (GNSS) receiver to determine a current location of the mobile device, comprising obtaining a partial position fix providing a coarse approximation for the current location, using the GNSS receiver, based on Doppler frequency shift measurements, ephemeris data already stored in a memory of the mobile device and a received time tag within a received GNSS signal; and a processor configured to prioritize cellular network frequency bands based on the current location to define a band priority and to select a cellular network based on the band priority.

8. The mobile device as claimed in claim 7 wherein the processor activates the GNSS receiver in response to activating the cellular radiofrequency transceiver.

9. The mobile device as claimed in claim 7 wherein the processor is configured to search a PLMN list on activating a cellular radiofrequency transceiver and interrupt a search of the PLMN list only when the mobile device has determined the current location and the bands have been prioritized.

* * * * *